United States Patent
Duff et al.

(10) Patent No.: US 8,838,144 B2
(45) Date of Patent: Sep. 16, 2014

(54) ADJUSTING USER SETTINGS ON A HANDHELD MOBILE COMMUNICATION DEVICE BASED UPON LOCATION

(75) Inventors: Robert Duff, Waterloo (CA); Robert H. Wood, Waterloo (CA); Maxime Matton, Waterloo (CA)

(73) Assignee: BlackBerry Limited, Waterloo (CA)

( * ) Notice: Subject to any disclaimer, the term of this patent is extended or adjusted under 35 U.S.C. 154(b) by 786 days.

(21) Appl. No.: 12/017,259

(22) Filed: Jan. 21, 2008

(65) Prior Publication Data

US 2009/0186630 A1    Jul. 23, 2009

(51) Int. Cl.
*H04W 4/02* (2009.01)
*H04M 1/725* (2006.01)

(52) U.S. Cl.
CPC ...... *H04M 1/72572* (2013.01); *H04M 2250/10* (2013.01); *H04W 4/02* (2013.01); *H04M 1/72552* (2013.01)
USPC ............ 455/456.3; 455/412.1; 455/466; 455/456.1

(58) Field of Classification Search
CPC ......... H04W 4/02; H04W 4/025; H04W 4/04; H04W 64/00
USPC .............. 455/456.1–457, 466, 412.1–412.2
See application file for complete search history.

(56) References Cited

U.S. PATENT DOCUMENTS

| | | | |
|---|---|---|---|
| 6,119,014 A * | 9/2000 | Alperovich et al. | 455/466 |
| 2003/0073406 A1* | 4/2003 | Benjamin et al. | 455/41 |
| 2004/0235464 A1* | 11/2004 | Korkalo et al. | 455/418 |
| 2004/0266454 A1 | 12/2004 | Nielsen et al. | |
| 2005/0096045 A1 | 5/2005 | Palmer et al. | |
| 2006/0052113 A1* | 3/2006 | Ophir et al. | 455/456.1 |
| 2006/0085502 A1* | 4/2006 | Sundararajan et al. | 709/204 |
| 2006/0205394 A1 | 9/2006 | Vesterinen | |
| 2007/0185962 A1 | 8/2007 | Bocking et al. | |
| 2007/0203992 A1 | 8/2007 | Coskun et al. | |

OTHER PUBLICATIONS

Apple iPhone Benutzerhandbuch, Internet Citation, (online) 9 Nov. 9, 2007, XP002483235 internet. Retrieved from the Internet: URL:http://manuals.info.apple.com/de-iphone_Benutzerhandbuch.pdf. page 28* p. 52-p. 53*.

Teltarife: iPhone: Revolutionäres Handy oder überschätztes Kultgerät? Internet citation, (line) XP002483236, Retrieved from the internet : URL:http://www.teltarif.de/h/iphone/>(retrieved on Jun. 6, 2008).

Benq-Siemens: Benq-Siemens S68, Internet citation, online 2005, XP002483237 Internet , Retrieved from the internet: URL:http://after-sales-service.t-mobile.de/eg_online/siemens/pdf/s68_bda-d.pdf> (retrieved on Jun. 6, 2008).

Extended European Search Report dated Jul. 16, 2008. In corresponding application No. 08150466.4.

(Continued)

*Primary Examiner* — Marcos Torres
(74) *Attorney, Agent, or Firm* — Novak Druce Connolly Bove + Quigg LLP

(57) ABSTRACT

A handheld electronic device that receives geo-location based signal data into a microprocessor on board the handheld electronic device. The microprocessor processes the signal data into location data representative of the present geographic location of the electronic handheld device. The microprocessor adjusts at least one user defined setting of the handheld electronic device based on whether the location data indicates that the handheld electronic device is within stored geographical boundaries.

20 Claims, 6 Drawing Sheets

(56) References Cited

OTHER PUBLICATIONS

Office Action dated Nov. 7, 2011. In Canadian application No. 2,650,299.
Examination Report dated Oct. 26, 2009. In European application No. 08150466.4.
Examination Report dated Apr. 29, 2010. In European application No. 08150466.4.
Examination Report dated Mar. 23, 2009. In European application No. 08150466.4.
Office Action mailed May 28, 2012, in corresponding Canadian patent application No. 2,650,299.
Office Action mailed Oct. 16, 2012, in corresponding Canadian patent application No. 2,650,299.
Notice of Allowance and Fee(s) Due mailed Mar. 20, 2013, in corresponding Canadian patent application No. 2,650,299.
Summons to attend oral proceedings pursuant to Rule 115 (1) EPC mailed Dec. 15, 2010, in corresponding European patent application No. 08150466.4.

* cited by examiner

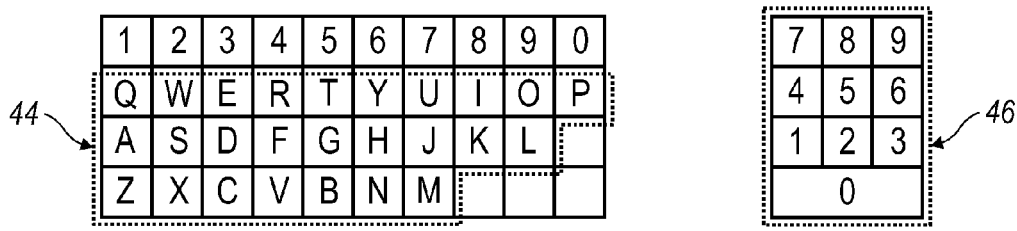
*FIG. 4*
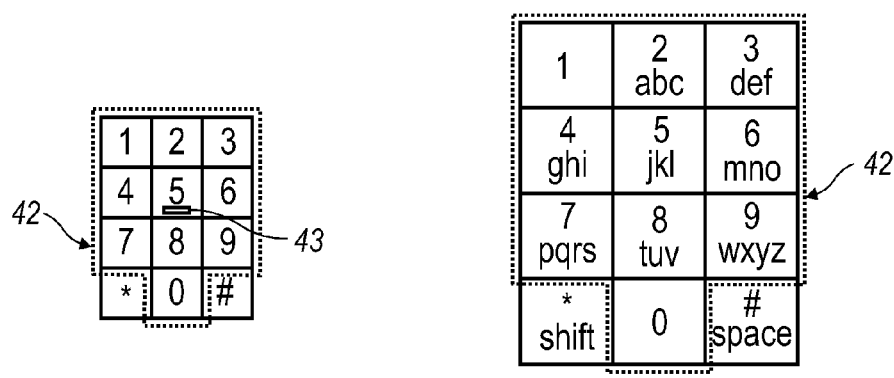
*FIG. 5*　　　*FIG. 6*

ADJUSTING USER SETTINGS ON A HANDHELD MOBILE COMMUNICATION DEVICE BASED UPON LOCATION

FIELD

This disclosure, in a broad sense, is directed toward a handheld electronic communication device that has wireless communication capabilities and the networks within which the handheld electronic communication device operates. More particularly, the disclosure relates to adjusting user defined settings of a wireless handheld communication device based on a defined geographical location.

BACKGROUND

With the proliferation of wireless communication systems, compatible handheld communication devices are becoming more prevalent, as well as advanced. Whereas in the past such handheld communication devices were typically limited to either voice transmission (cell phones) or text transmission (pagers and PDAs), today's consumer often demands a multifunctional device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Many mobile communication devices allow a user to adjust settings for personalized operation of the device. For example a user may designate the mobile communication device to ring, or vibrate, or be silent upon reception of a call. Similarly, a user may designate the mobile communication device to ring, or vibrate, or be silent upon reception of a text message or email. Furthermore, a user may designate a specific ring to be played based on the specific identity of the sending device of the call.

Additionally, a mobile communication device can be equipped to determine the geographical position of the device. A device may calculate its geographical position using triangulation or using the Global Positioning System (GPS). It is desirable to configure the mobile device to improve the ability of the user to customize the performance of the mobile communication device.

BRIEF DESCRIPTION OF THE DRAWINGS

Exemplary methods and arrangements conducted and configured according to the advantageous solutions presented herein are depicted in the accompanying drawings wherein:

FIG. 3a illustrates an exemplary QWERTY keyboard layout;

FIG. 3b illustrates an exemplary QWERTZ keyboard layout;

FIG. 3c illustrates an exemplary AZERTY keyboard layout;

FIG. 3d illustrates an exemplary Dvorak keyboard layout;

FIG. 4 illustrates a QWERTY keyboard layout paired with a traditional ten-key keyboard;

FIG. 5 illustrates ten digits comprising the numerals 0-9 arranged in a traditional, ITU Standard E.161 numeric telephone keypad layout, including the * and # keys flanking the 0 key;

FIG. 6 illustrates a traditional or standard phone key arrangement or layout according to the ITU Standard E.161 including both numerals and letters;

DETAILED DESCRIPTION

Figure 1:
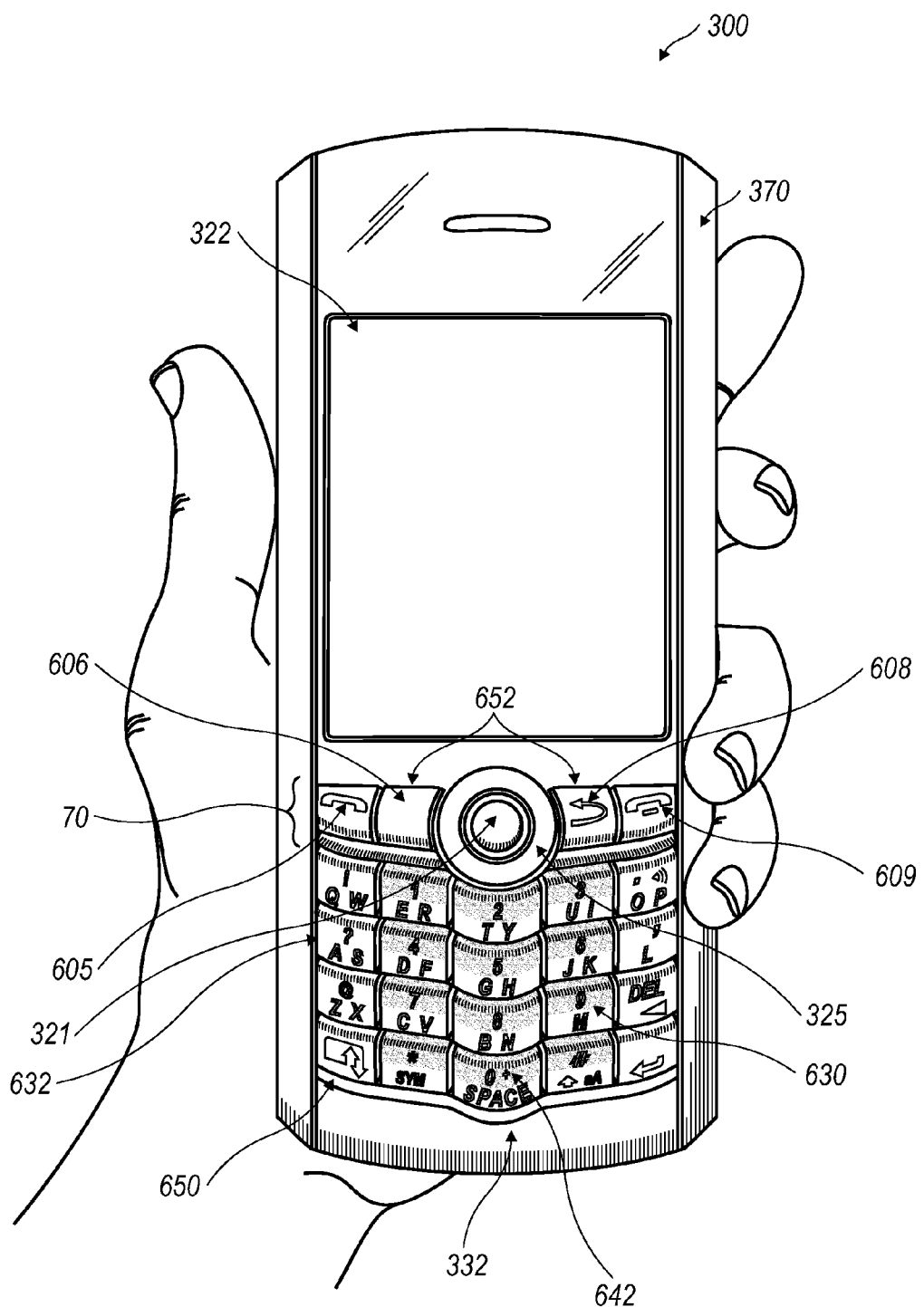
FIG. 1 illustrates an exemplary handheld communication device cradled in the palm of a user's hand.
Figure 2:
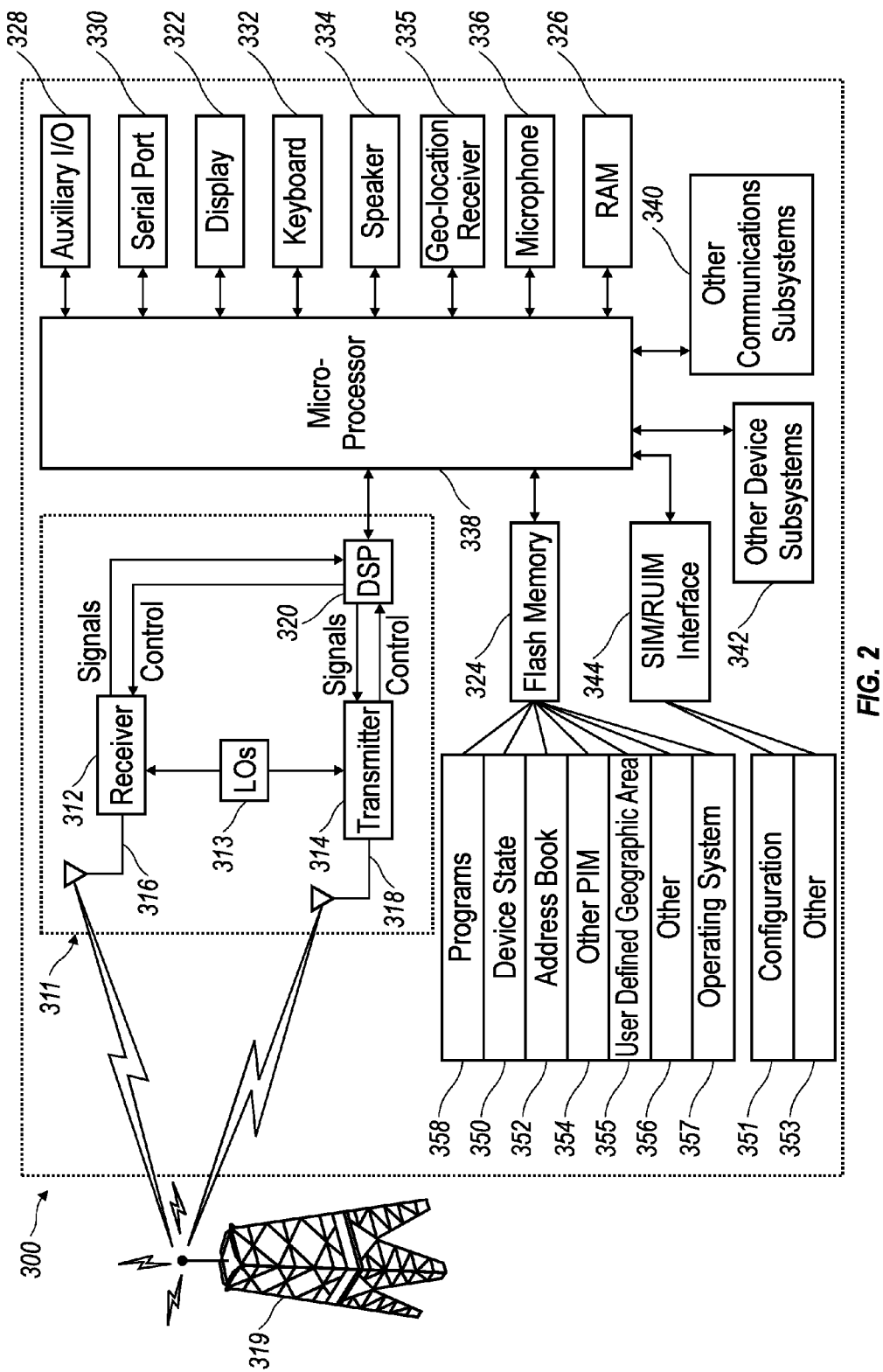
FIG. 2 is a block diagram representing a wireless handheld communication device interacting in a communication network.

An exemplary handheld electronic communication device 300 is shown in FIG. 1, and the device's cooperation in a wireless network 319 is exemplified in the block diagram of FIG. 2. These figures are exemplary only, and those persons skilled in the art will appreciate the additional elements and modifications necessary to make the handheld electronic communication device 300 work in particular network environments. While the following exemplary embodiments are described in connection with handheld wireless communication devices, it can be appreciated by those skilled in the art that these embodiments can also be implemented in other mobile devices such as PDAs, or the like.

As shown in the block diagram of FIG. 2, the handheld electronic communication device 300 includes a microprocessor 338 that controls the operation of the handheld electronic communication device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display screen 322, a keyboard 332, a speaker 334, a microphone 336, random access memory (RAM) 326, and flash memory 324. Other communication subsystems 340 and other device subsystems 342 are generally indicated as being functionally connected with the microprocessor 338 as well. An example of a communication subsystem 340 is that of a short range communication system such as BLUETOOTH® communication module or a Wi-Fi communication module (a communication module in compliance with IEEE 802.11b) and associated circuits and components. Additionally, the microprocessor 338 is able to perform operating system functions and preferably enables execution of software applications on the handheld electronic communication device 300.

The auxiliary I/O subsystem 328 can take the form of a variety of different navigation tools (multi-directional or single-directional) such as a trackball navigation tool 325 as illustrated in the examplary embodiment shown in FIG. 1. These navigation tools 327 are preferably located on the front surface of the handheld electronic communication device 300 but may be located on any exterior surface of the handheld electronic communication device 300. Other auxiliary I/O subsystems can include external display devices and externally connected keyboards (not shown). While the above examples have been provided in relation to the auxiliary I/O subsystem 328, other subsystems capable of providing input or receiving output from the handheld electronic communication device 300 are considered within the scope of this disclosure. Additionally, other keys may be placed along the side of the handheld electronic communication device 300 to function as escape keys, volume control keys, scrolling keys, power switches, or user programmable keys and may likewise be programmed accordingly.

As may be appreciated from FIG. 1, the handheld electronic communication device 300 comprises a lighted display screen 322 located above a keyboard 332 constituting a user input and suitable for accommodating textual input to the handheld electronic communication device 300. The front face of the body 370 of the handheld electronic communication device has a navigation row 70 and a key field 650 that includes alphanumeric input keys 630, alphabetic input keys 632, numeric input keys 642, and other function keys as shown in FIG. 1. As shown, the handheld electronic communication device 300 is of unibody construction, also known as a "candy-bar" design.

Keys, typically of a push-button or push-pad nature, perform well as data entry devices but present problems to the user when they must also be used to effect navigational control over a screen-cursor. In order to solve this problem, the present handheld electronic communication device 300 preferably includes an auxiliary input that acts as a cursor navigational tool and which is also exteriorly located upon the front face of the body 370 of the handheld electronic communication device 300. Its front face location is particularly advantageous because it makes the tool easily thumb-actuable like the keys of the keyboard. The placement of the trackball user input device navigation tool 327 is preferably above the keyboard 332 and below the display screen 322; here, it avoids interference during keyboarding and does not block the user's view of the display screen 322 during use. (See FIG. 1).

As illustrated in FIGS. 1 and 2, the present disclosure is directed to a handheld electronic communication device 300 configured to send and receive text messages. The handheld electronic communication device 300 includes a hand cradleable body configured to be held in one hand by an operator of the device during text entry. A display screen 322 is included that is located on a front face of the body 370 and upon which information is displayed to the operator during text entry. A key field 650 is also located on the front face of the body 370 of the elongate body and comprises a plurality of keys including a plurality of alphanumeric keys, symbol keys, and function keys. A navigation row 70 including menu keys 652 and a user input device 321 is also located on the front face of the body 370. The alphanumeric input keys 630 comprise a plurality of alphabetic and/or numeric input keys 632, 342 having letters and/or numbers associated therewith. The order of the letters of the alphabetic input keys 632 on the presently disclosed handheld electronic communication device can be described as being of a traditional, but non-ITU Standard E.161 layout. This terminology has been utilized to delineate the fact that such a telephone keypad as depicted in FIG. 6 may not allow for efficient text entry on the handheld electronic communication device 300.

The handheld electronic communication device 300 is also configured to send and receive voice communications such as mobile telephone calls. To facilitate telephone calls, two call keys 605, 609 ("outer keys") are provided in the upper, navigation row 70 (so-called because it includes the user input device navigation tool 327) at the outer ends of the navigation row 70. One of the two call keys is a call initiation key 605, and the other is a call termination key 609. The navigation row 70 also includes another pair of keys ("flanking keys") that are located immediately adjacent to the user input device navigation tool 327, with one flanking key on either side of the user input device navigation tool 327. It is noted that the outer keys are referred to as such not because they are necessarily the outermost keys in the navigation row—there may be additional keys located even further outwardly of the outer keys if desired—but rather because they are located outwardly with respect to the flanking keys. The flanking keys may, for instance, constitute the menu keys 652, which include a menu call-up key 606 and an escape or back key 608. The menu call-up key 606 is used to bring up a menu on the display screen 322 and the escape key 608 is used to return to the previous screen or previous menu selection. The functions of the call keys and the menu keys may, of course, be provided by buttons that are located elsewhere on the device, with different functions assigned to the outer keys and the flanking keys.

Furthermore, the device is equipped with components to enable operation of various programs, as shown in FIG. 2. In an exemplary embodiment, the flash memory 324 is enabled to provide a storage location for the operating system 357, application programs 358, and data. The operating system 357 is generally configured to manage other application programs 358 that are also stored in flash memory 324 and executable on the microprocessor 338. The operating system 357 honors requests for services made by application programs 358 through predefined application program 358 interfaces. More specifically, the operating system 357 typically determines the order in which multiple application programs 358 are executed on the microprocessor 338 and the execution time allotted for each application program 358, manages the sharing of flash memory 324 among multiple application programs 358, handles input and output to and from other device subsystems 342, and so on. In addition, users can typically interact directly with the operating system 357 through a user interface usually including the keyboard 332 and display screen 322. While in an exemplary embodiment the operating system 357 is stored in flash memory 324, the operating system 357 in other embodiments is stored in read-only memory (ROM) or similar storage element (not shown). As those skilled in the art will appreciate, the operating system 357, device application program 358 or parts thereof may be loaded in RAM 326 or other volatile memory.

In one exemplary embodiment, the flash memory 324 contains application programs 358 for execution on the handheld electronic communication device 300 including an address book 352, a personal information manager (PIM) 354, and the device state 350. Furthermore, application programs 358 and other information 356 including data can be segregated upon storage in the flash memory 324 of the handheld electronic communication device 300. In at least one embodiment, the flash memory 324 also contains information relating to the user defined geographical area. This user defined geographical area can be used to restrict one or more functions on the handheld electronic communication device 300.

When the handheld electronic communication device 300 is enabled for two-way communication within the wireless communication network 319, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, and the Code Division Multiple Access (CDMA) network and those networks, generally described as packet-switched, narrowband, data-only technologies which are mainly used for short burst wireless data transfer. For the systems listed above, the handheld electronic communication device 300 must be properly enabled to transmit and receive signals from the communication network 319. Other systems may not require such identifying information. GPRS, UMTS, and EDGE require the use of a Subscriber Identity Module (SIM) in order to allow communication with the communication network 319. Likewise, most CDMA systems require the use of a Removable Identity Module (RUIM) in order to communicate with the CDMA network. The RUIM and SIM card can be used in multiple different handheld electronic communication devices 300. The handheld electronic communication device 300 may be able to operate some features without a SIM/RUIM card, but it will not be able to communicate with the network 319. A SIM/RUIM interface 344 located within the handheld electronic communication device 300 allows for removal or insertion of a SIM/RUIM card (not shown). The SIM/RUIM card features memory and holds key configurations 351, and other information 353 such as identification and subscriber related information. With a properly enabled handheld electronic communication device 300, two-way communication between the handheld electronic communication device 300 and communication network 319 is possible.

If the handheld electronic communication device 300 is enabled as described above or the communication network 319 does not require such enablement, the two-way communication enabled handheld electronic communication device 300 is able to both transmit and receive information from the communication network 319. The transfer of communication can be from the handheld electronic communication device 300 or to the handheld electronic communication device 300. In order to communicate with the communication network 319, the handheld electronic communication device 300 in the presently described exemplary embodiment is equipped with an integral or internal antenna 318 for transmitting signals to the communication network 319. Likewise the handheld electronic communication device 300 in the presently described exemplary embodiment is equipped with another antenna 316 for receiving communication from the communication network 319. These antennae (316, 318) in another exemplary embodiment are combined into a single antenna (not shown). As one skilled in the art would appreciate, the antenna or antennae (316, 318) in another embodiment are externally mounted on the handheld electronic communication device 300.

When equipped for two-way communication, the handheld electronic communication device 300 features a communication subsystem 311. As is well known in the art, this communication subsystem 311 is modified so that it can support the operational needs of the handheld electronic communication device 300. The subsystem 311 includes a transmitter 314 and receiver 312 including the associated antenna or antennae (316, 318) as described above, local oscillators (LOs) 313, and a processing module 320 which in the presently described exemplary embodiment is a digital signal processor (DSP) 320.

It is contemplated that communication by the handheld electronic communication device 300 with the wireless network 319 can be any type of communication that both the wireless network 319 and handheld electronic communication device 300 are enabled to transmit, receive and process. In general, these can be classified as voice and data. Voice communication is communication in which signals for audible sounds are transmitted by the handheld electronic communication device 300 through the communication network 319. Data is all other types of communication that the handheld electronic communication device 300 is capable of performing within the constraints of the wireless network 319.

Example device applications that can depend on such data include email, contacts and calendars. For each such application synchronization with home-based versions on the applications can be critical for either or both of their long term and short term utility. As an example, emails are often time sensitive, so substantially real time synchronization is highly desirable. Contacts, on the other hand, can be usually updated less frequently without inconvenience. Therefore, the utility of the handheld electronic communication device 300 is significantly enhanced (if not enabled) when connectable within a communication system, and particularly when connectable on a wireless basis in a network 319 in which voice, text messaging, and other data transfer are accommodated.

As intimated hereinabove, one of the more important aspects of the handheld electronic communication device 300 to which this disclosure is directed is its size. While some users will grasp the handheld electronic communication device 300 in both hands, it is intended that a predominance of users will cradle the handheld electronic communication device 300 in one hand in such a manner that input and control over the handheld electronic communication device 300 can be effected using the thumb of the same hand in which the handheld electronic communication device 300 is held. However, it is appreciated that additional control can be effected by using both hands. The size of the handheld electronic communication device 300 must be kept commensurately small, in order to have a handheld electronic communication device 300 that is easy to grasp and desirably pocketable. Of the device's dimensions, limiting its width is important for the purpose of assuring cradleability in a user's hand. Moreover, it is preferred that the width of the handheld electronic communication device 300 be maintained at less than eight centimeters (approximately three inches). Keeping the handheld electronic communication device 300 within these dimensional limits provides a hand cradleable unit that users prefer for its usability and portability. Limitations with respect to the height (length) of the handheld electronic communication device 300 are less stringent when considering hand-cradleability. Therefore, in order to gain greater size, the handheld electronic communication device 300 can be advantageously elongated so that its height is greater than its width, but still remains easily supported and operated in one hand.

A potential drawback is presented by the small size of the handheld electronic communication device 300 in that there is limited exterior surface area for the inclusion of user input and device output features. This is especially true for the "prime real estate" on the front face of the body 370 of the handheld electronic communication device 300, where it is most advantageous to include a display screen 322 that outputs information to the user. The display screen 322 is preferably located above a keyboard 332 that is utilized for data entry into the handheld electronic communication device 300 by the user. If the display screen 322 is provided below the keyboard 332, a problem occurs in that viewing the display screen 322 is inhibited when the user is inputting data using the keyboard 332. Therefore it is preferred that the display screen 322 be above the input area, thereby solving the problem by assuring that the hands and fingers do not block the view of the display screen 322 during data entry periods.

To facilitate textual data entry into the handheld electronic communication device 300, a keyboard 332 is provided. In the exemplary illustrated embodiment, a full alphabetic keyboard 332 is utilized in which there is one key per letter (with some of the letter keys also having numbers, symbols, or functions associated with them). In this regard, the associated letters can be advantageously organized in QWERTY, QWERTZ, AZERTY, or Dvorak layouts, among others, thereby capitalizing on certain users' familiarity with these various letter orders. In order to stay within the bounds of the limited front surface area, however, each of the keys must be commensurately small when, for example, twenty-six keys must be provided in the instance of the English language.

Figures 3A, 3B, 3C, 3D:
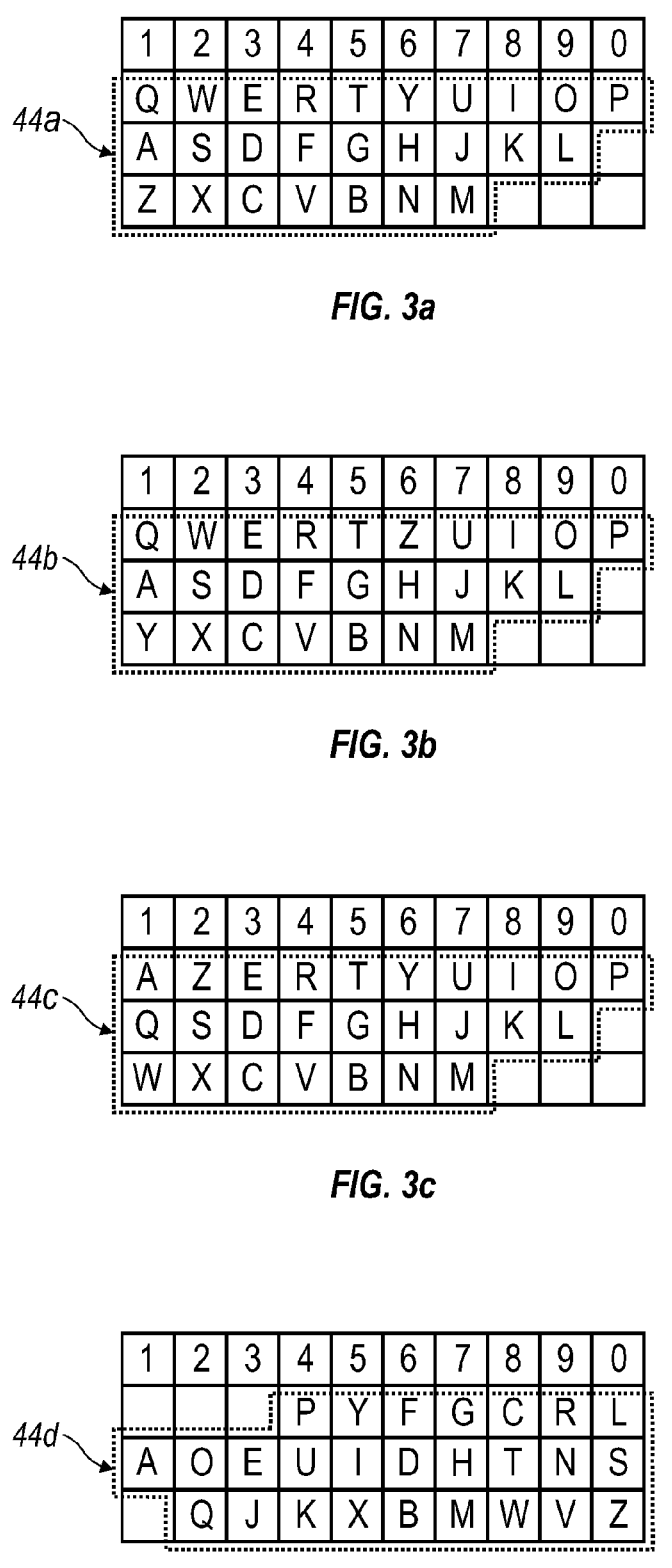

The various characters, commands, and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44a shown in FIG. 3a. The QWERTZ keyboard layout is normally used in German-speaking regions; this alphabetic key arrangement 44b is shown in FIG. 3b. The AZERTY keyboard layout 44c is normally used in French-speaking regions and is shown in FIG. 3c. The Dvorak keyboard layout was designed to allow typists to type faster; this alphabetic key arrangement 44d is shown in FIG. 3d. In other exemplary embodiments, keyboards having multi-language key arrangements can be implemented.

Alphabetic key arrangements are often presented along with numeric key arrangements. Typically, the numbers 1-9 and 0 are positioned in the row above the alphabetic keys 44a-d, as shown in FIG. 3a-d. Alternatively, the numbers share keys with the alphabetic characters, such as the top row of the QWERTY keyboard. Yet another exemplary numeric key arrangement is shown in FIG. 4, where a "ten-key" style numeric keypad 46 is provided on a separate set of keys that is spaced from the alphabetic/numeric key arrangement 44. Still further, ten-key numeric arrangements may be common with or shared with a subset of the alphabetic keys. A ten-key styled numeric keypad includes the numbers "7", "8", "9" arranged in a top row; "4", "5", "6" arranged in a second row; "1", "2", "3" arranged in a third row; and "0" in a bottom row.

Further, a numeric phone key arrangement 42 is exemplarily illustrated in FIG. 5. As shown in FIG. 5, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld devices 300 to include a combined text-entry keyboard and a telephony keyboard. Examples of such handheld devices 300 include mobile stations, cellular telephones, wireless personal digital assistants (PDAs), two-way paging devices, and others. Various keyboards are used with such devices and can be termed a full keyboard, a reduced-format keyboard, or phone key pad. In embodiments of a handheld device 300 having a full keyboard, the alphabetic characters are singly associated with the plurality of physical keys. Thus, in an English-language keyboard of this configuration, there are at least 26 keys in the plurality, with one letter per alphabetic key.

FIGS. 5 and 6 both feature numeric keys arranged according to the ITU Standard E.161 form. In addition, FIG. 6 also incorporates alphabetic characters according to the ITU Standard E.161 layout as well. The International Telecommunications Union ("ITU") has established phone standards for the arrangement of alphanumeric keys. The standard phone numeric key arrangement shown in FIGS. 5 (no alphabetic letters) and 6 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. As shown in FIG. 4, the numeric key arrangement can be overlaid on a QWERTY arrangement. The numeric arrangement as shown can be aptly described as a top-to-bottom ascending order three-by-three-over-zero pattern.

While several keyboard layouts have been described above, the layouts can be described as having keys disposed on the keyboard in a QWERTY, reduced QWERTY, QWERTZ, Dvorak, or AZERTY key layout. These familiar keyboard layouts allow users to type more intuitively and more quickly than, for example, on the standard alphabetic layout on a telephone pad. As mentioned above, the key arrangements can be reduced compared to a standard layout through the use of more than one letter or character per key. By utilizing fewer keys, the keys can be made larger and therefore more convenient to the user.

Figure 9:
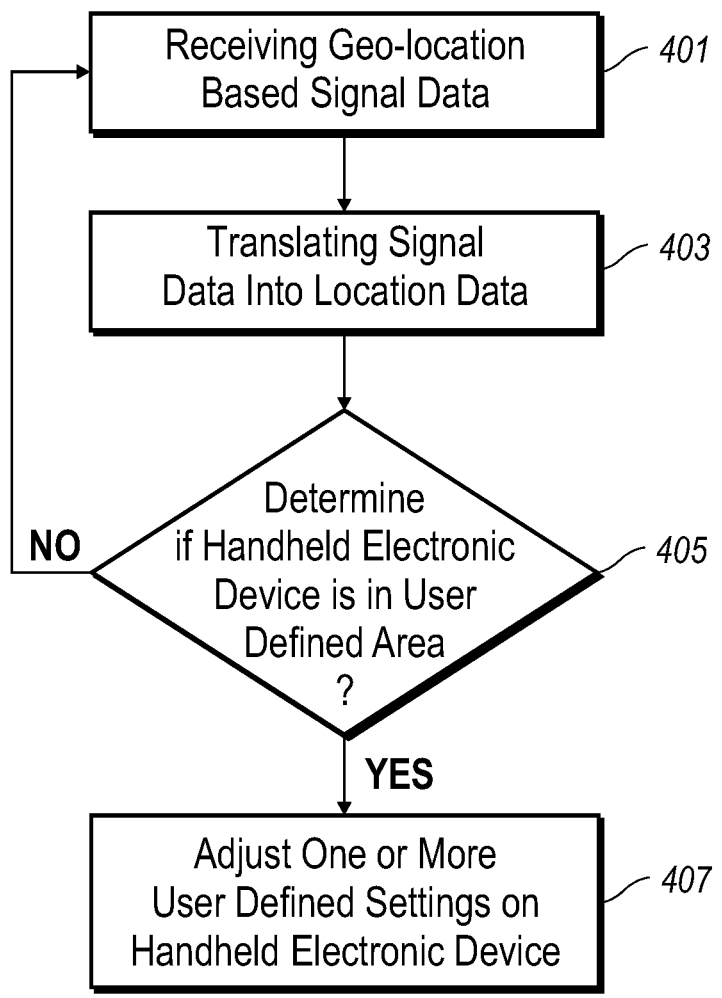
FIG. 9 is a flow chart illustrating another embodiment of a method for adjusting settings of a handheld communication device based on its geographic location.

The handheld electronic communication device can include memory, a geo-location based signal receiver, a microcontroller, and in some embodiments a configuration signal receiver. The memory may be incorporated into the microprocessor. The memory of the device is capable of storing various types of data including data defining geographic boundaries of a user recorded area and data defining a user setting to be employed or adjusted on the wireless handheld communication device relative to the user recorded area. The information stored in memory can be received wirelessly, downloaded through a specialized port, or pre-loaded on the device. As shown in FIG. 9, a geo-location based signal receiver typically receives satellite-based geo-location signal data that defines a present geographical location of the device (block 401). The signal data is translated into location data representative of the present geographic location of the device (block 403). The location information can be used to determine whether the device is presently located in the user defined area based on a comparison to geographical boundaries of user defined areas stored in memory (block 405). The microcontroller adjusts the functionality of the device based on the determination of whether the device is presently located in the user defined area (block 407).

In another embodiment, the handheld communication device includes a microprocessor, memory, and geo-location based signal data receiver. The microprocessor allows for receiving, processing and outputting electronic data and for outputting control signals. The microprocessor is also capable of performing management tasks related to the various components and attachments to the device including communication subsystems and the display screen.

The memory is capable of storing data defining geographical boundaries of a user defined operating area and data defining at least one user setting. The user setting can be adjusted based on whether the handheld device is located in the user defined area. The memory may be incorporated into the microprocessor. Examples of memory include a flash memory device, a read-only memory device, and a random access memory device. Furthermore, the memory is capable of storing additional information that is described above in greater detail, in relation to FIG. 2 including programs 358, application data, address books 352, identification information, device state 350 and other personal information management (PIM) 354.

The handheld electronic communication device further includes a position determining device for ascertaining a present geographical position of the handheld device utilizing satellite-derived information. Additionally, the position determining device can determine whether the device is presently located in the user defined operating area based on comparison to geographical boundaries of the user defined operating area stored in memory. Alternatively, the determination of whether the device is presently located in the user defined operating area can be performed by the microprocessor. The position determining device can be based on the global positioning system (GPS). In other embodiments, the position determination device can rely on signals sent from wireless transmitters indicating the service carrier. If the service carrier is one that is not within the subscriber's approved carriers the device can indicate that it is roaming, and thus outside of the subscriber's approved area. Additional systems that allow the handheld electronic device to determine its location will be described below.

In another embodiment, a method for adjusting the user settings on a wireless handheld device is presented. The method involves storing data at the wireless handheld communication device that defines geographical boundaries of a user defined operating area of the device; receiving geo-location based signal data into a microprocessor on board the handheld electronic device; processing the signal data into location data representative of the present geographic location of the electronic handheld device; and determining whether the device is presently located in the user defined operating area based on a comparison to the stored geographical boundaries of the user defined operating area; and adjusting at least one user defined setting on the device when it is determined that the device is presently located in the user defined area based on remotely stored user defined setting. Additionally, the data defining the user settings to be adjusted can be remotely stored. These user defined settings are to be implemented when the device is located in the user defined area. Furthermore, the wireless handheld communication device may receive data that defines geographical boundaries of a user defined operating area of the device. The above described elements can be combined together to produce different variations of methods to adjust the user settings of the device.

The above described device user defined settings can include a variety of different user defined settings. For example, the user defined settings can relate to the telephone features, such as adjusting the ring-tone, call capabilities, speaker phone capabilities, call duration, and the like. Other user defined settings relate to the handling of incoming messages. For example, the transmission of email attachments, text messaging applications, email forwarding may be defined by the user. Additionally, the user defined settings may include controlling the operation of an integrated digital camera, the downloading of data (for example, websites), and the storing of data on removable memory. Other user defined settings that could be controlled in a similar fashion would be appreciated by one having ordinary skill in the art.

Figure 7:
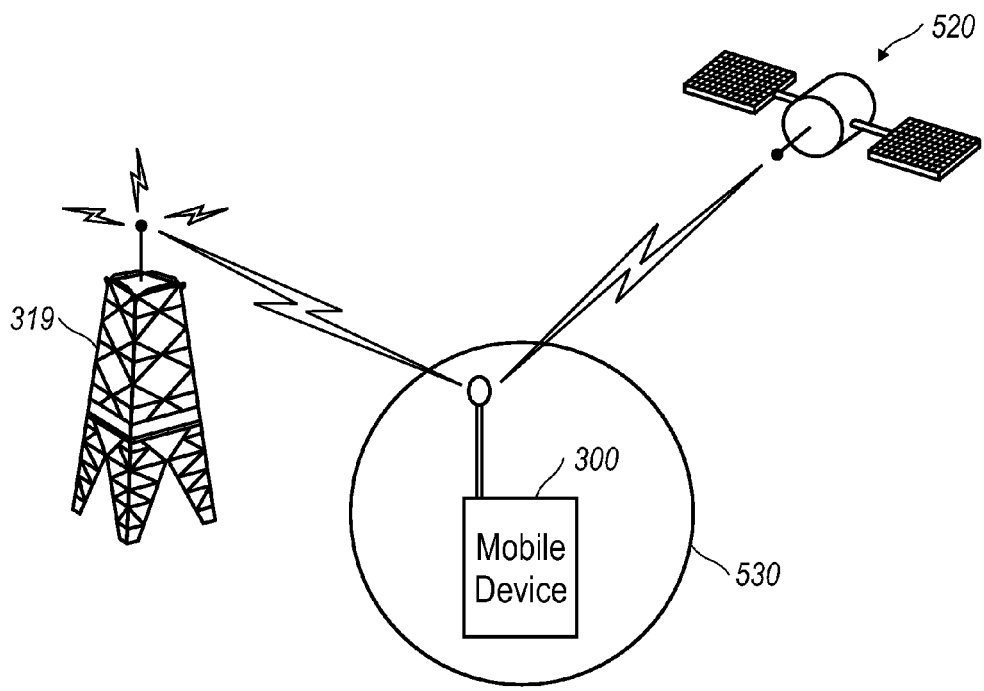
FIG. 7 illustrates an exemplary diagram showing the mobile device in communication with a communication network and a satellite.

As previously described, it is desirable for a user to be able to program a wireless handheld communication device to adjust the settings of the handheld mobile communication device based on its geographic location. Exemplarily embodiments of the handheld device 300 and associated components and communication with a satellite 520 can be seen in FIG. 7. In a preferred embodiment, one or more user device setting is adjusted based upon the geographical location of the device. Data regarding the user defined operating area or zone 530 can be stored on the device. This data can be received via a wireless communication network 319, as shown in FIG. 7. However, it is also possible that the data for the user defined zone 530 is received while the device 300 is connected to a cradle. The data for the user defined zone 530 can also be programmed directly into the device 300 by a user. This data preferably defines a set of geographical boundaries within which device setting adjustment is desired. This data delimiting the geographical boundaries is preferably defined in terms of coordinates. Other data may be used to define the geographical boundaries as is desired in order to effectively process the data received by the handheld 300 from a positioning system. Preferably, the position is determined via satellite data, but the position can also be determined using data received from the communication network 319 upon which the device 300 is operating. For example, the position of the device could be determined using a triangulation method based upon signals received from cell towers. Additionally, the location of the device could be done more generally such that if the device is outside the area of network coverage, its position is determined based upon a roaming indicator signal.

A user of the device can store data defining the geographical boundaries of the user defined area using current position information on the device. This enables a user to walk or otherwise move about the periphery of around the premises or area to define the boundary of the user defined zone. As the user walks the perimeter, boundary location coordinates can be generated using the device. These boundary coordinates can be later used to define the geographical boundary of the stored user defined area. The boundary location coordinates are obtained by positioning or holding the handheld device at a particular location proximate to the geographical boundary and defining the location as a set of coordinates (or other location data) as part of the saved data. The user can store multiple locations to create a "fence" using the user defined areas. Alternatively, the geographical locations can be used to define entry points to a building or premises. Once the position of the device 300 has been determined, its location in relation to the geographical boundaries of the user defined operating area 530 is determined. As exemplarily shown in FIG. 7, the device 300 is located within a user defined zone 530. In a preferred embodiment, a geo-location based signal receiver is implemented to receive satellite-based information that defines a present geographical position of the device 300 and a microprocessor 338 determines if the device 300 is located in the user defined area 530 based on a comparison to geographical boundaries of the user defined area 530 stored in memory. The information regarding the geo-location of the device 300 may be processed by a specially designed circuit as previously described. The specially designed circuit may be implemented within the microprocessor 338. Then, this data is used by the microprocessor 338 to determine the location of the device 300 with respect to the user defined area/zone 530. The determination of the relative position of the device 300 can be made on a continuous basis or at predefined intervals in order to optimize battery life of the device 300. While the device 300 is located within the user defined area 530, the microprocessor 338 adjusts the settings of the wireless handheld device 300 based on the user's programmed information.

Figure 8:
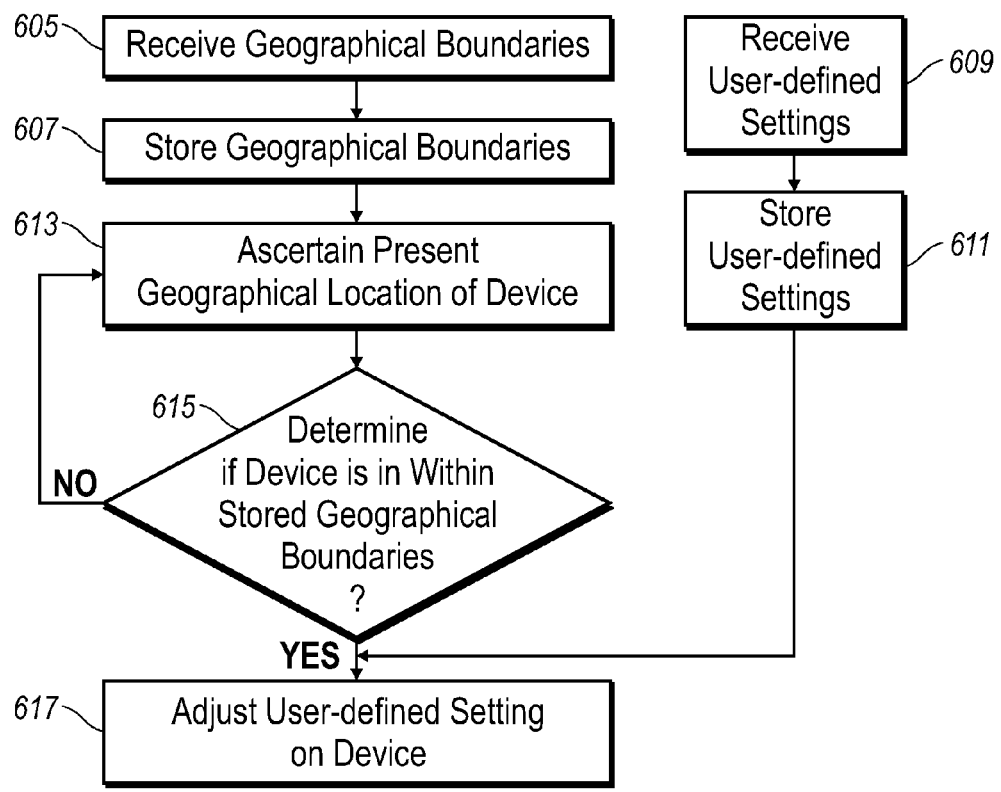
FIG. 8 is a flow chart illustrating an embodiment of a method for adjusting settings of a handheld communication device based on its geographic location.

Referring to FIG. 8, the geographical boundaries are received (block 605) and stored (block 607). The user-defined settings to be adjusted are received (block 609) and stored (block 611). Next, the present geographical position/location of the device 300 is ascertained using satellite-derived information (block 613). Then a determination is made whether the device 300 is located within the stored geographical boundaries (block 615). If it has been determined that the device 300 is within one of the stored geographical boundaries, then the appropriate subsystem or functional aspect user defined settings are adjusted (block 617). However, if the device 300 is not within the stored geographical boundary the present location of the device 300 is monitored. Likewise once the user defined setting has been adjusted on the device 300, the position of the device is evaluated to determine when the device has left the user defined area. The user defined settings to be adjusted can be one of the above settings. The geographical as well as user defined settings can be predetermined (prerecorded) or transmitted to the device 300 using one of the systems described herein. These actions include, for example, e-mail filter settings, wireless transmission settings, user profile settings, and the like.

As depicted in FIG. 7, the device 300 is capable of receiving data transmitted via satellite 520 to determine geo-location. The satellite 520 is preferably a GPS satellite, yet in other embodiments the satellite 520 can be another type of satellite, such as a GLONASS (Global Orbiting Navigation Satellite System) satellite, equipped to transmit data to a receiver for determination of position information. The data transmitted by the satellite 520 relates to time information, which can be used by the processor 338 of a receiving device 300 to determine position. In order to obtain an accurate geo-location determination, data from four different satellites is preferred while geo-location information can be obtained if only three satellites are able to transmit data. Other geo-location systems may use a similar or different satellite configuration requirement than the GPS system. One skilled in the art would be able to make the necessary adaptations to allow the device 300 to function with the appropriate satellite system. Additionally, other variants of GPS such as differential GPS and WAAS (Wide Area Augmentation System) allow for greater accuracy in geo-location determination through the use of additional data. The determination of the geo-location of the device can be made using a specially designed processor for position determination. This specially designed processor may be incorporated into the microprocessor 338.

Additionally, the geo-location of a handheld communication device 300 can be determined by using the wireless network infrastructure 319. If the device 300 is in an area of coverage such that three transmitters of the wireless network can communicate with the device 300, a triangulation method of device location may be implemented. Other techniques for locating the handheld communication device 300 using communication network transmissions for geo-location determination of the device are also considered within the scope of this disclosure and are easily appreciated by those persons skilled in these arts.

When the handheld electronic communication device 300 enters a stored user defined area, user defined email settings can be implemented. For example, when a user enters a home zone area, the user may wish to allow only specific types of email messages to be received by the handheld electronic communication device 300. For instance, the user may wish to only receive messages that have an urgent priority associated therewith. The urgent priority can be denoted using a flag or similar indicator. Additionally, the user may desire to receive a predetermined number of characters of the email message to determine whether the user wishes to receive additional data associated with the email message. The predetermined number of characters is preferably enough characters to allow the user to determine the meaning of the message. In at least one embodiment, the predetermined number of characters is 200. In another embodiment, the predetermined number of characters is between 150 and 350 characters. Furthermore, the user may wish to prohibit the downloading of all email messages when the handheld electronic communication device 300 is located within the home zone area.

When the handheld electronic communication device 300 is located within a meeting area, the user may wish to adapt the handling of email messages. For example, when a user enters a meeting area, the user may wish to allow only specific types of email messages to be received by the handheld electronic communication device 300. For instance, the user may wish to only receive messages that have an urgent priority associated therewith. Additionally, the user may desire to receive a predetermined number of characters of the email message to determine whether the user wishes to receive additional data associated with the email message. Furthermore, the user may wish to prohibit the downloading of all email messages when the handheld electronic communication 300 is located within the meeting area. In at least one embodiment, the meeting area can be defined using an administrative policy, such that employees of a company receive the restrictions automatically. The administrative policy can be implemented upon a given user, a group of users, or across the entire company. The administrative policy can include both location specific data as well as data relating to the user defined email settings.

In addition to the meeting and home zone areas as described above other areas can be used according to the above described embodiments. For example the other locations that a user or administrator may define include areas associated with an office, restaurants, homes of social acquaintances, and other areas. The handheld electronic communication device 300 may store these areas locally as described above.

In addition to the user defined locations as described above, the email settings may be adjusted based upon whether the handheld electronic communication device 300 is located a zone in which roaming charges apply. The determination of whether the handheld electronic communication device 300 is located within the roaming zone can be based upon a geo-location signal or using a signal transmitted from the wireless network 319 to the handheld electronic communication device 300. Once the signal indicative of the location of the whether the handheld electronic communication device 300 is within a roaming zone, the user email setting can be modified to only receive messages that have an urgent priority associated therewith. In at least another embodiment, a predetermined number of characters of the email message can be downloaded to the handheld electronic communication device 300. Furthermore, prohibiting the downloading of all email messages may be implemented.

Exemplary embodiments have been described hereinabove regarding both handheld electronic communication devices 300 as well as the communication networks 319 within which they operate. Various modifications to and departures from the disclosed embodiments will occur to those having skill in the art. It should be appreciated, however, that a focus of the present disclosure is the adjustment of settings of a handheld electronic communication device 300 based on the device's geographic location and user defined geographic boundaries. The subject matter that is intended to be within the spirit of this disclosure is set forth in the following claims.

What is claimed is:

1. A method for adjusting settings of an electronic device comprising:

receiving geo-location based signal data into a microprocessor of the electronic device;

processing said signal data into location data representative of the present geographic location of the electronic device;

adjusting a user defined email message downloading setting of the electronic device, at the electronic device, based on whether the location data indicates that the electronic device is within a stored user defined area, wherein the email message downloading setting indicates a predetermined number of characters of an email to be received at the electronic device; and downloading the predetermined number of characters of an email message to the electronic device in accordance with the user defined email message downloading setting in the event the device is within the stored user defined area and the email message contains more characters than the predetermined number of characters.

2. The method of claim 1, wherein the stored user defined area is a home zone area.

3. The method of claim 2, wherein the adjustment of a user defined message receiving setting further includes only receiving messages having an urgent priority associated therewith.

4. The method of claim 2, wherein the adjustment of a user defined message receiving setting further includes prohibiting receiving of all messages.

5. The method of claim 1, wherein the stored user defined area is a meeting area.

6. The method of claim 5, wherein the adjustment of a user defined message receiving setting further includes only receiving messages having an urgent priority associated therewith.

7. The method of claim 5, wherein the adjustment of a user defined message receiving setting further includes prohibiting receiving of all messages.

8. The method of claim 1, wherein said received geo-location based signal data is data indicative of the present communication service provider which determines whether roaming charges presently apply.

9. The method of claim 8, wherein the adjustment of a user defined message receiving setting further includes only receiving messages having an urgent priority associated therewith.

10. The method of claim 8, wherein the adjustment of a user defined message receiving setting further includes prohibiting receiving of all email messages.

11. The method of claim 1 wherein the adjustment of a user defined message receiving setting further includes prohibiting receiving a message having an attachment.

12. An electronic device comprising:

a geo-location based signal data receiver; and a microprocessor that converts an electronic signal received by said geo-location based signal data receiver into location data representative of the present geographic location of the electronic device, wherein the microprocessor adjusts a user defined email message downloading setting of the electronic device based on whether the location data indicates that the electronic device is within a stored user defined area, wherein the email message downloading setting indicates a predetermined number of characters of an email to be received at the electronic device, and downloads the predetermined number of characters of an email message to the electronic device in accordance with the user defined email message downloading setting in the event the device is within the stored user defined area and the email message contains more characters than the predetermined number of characters.

13. The electronic device of claim 12, wherein the stored user defined area is a home zone area.

14. The electronic device of claim 13, wherein the adjustment of a user defined message receiving setting further includes only receiving messages having an urgent priority associated therewith.

15. The electronic device of claim 13, wherein the adjustment of a user defined message receiving setting further includes prohibiting receiving of all messages.

16. The electronic device of claim 12, wherein the stored user defined area is a meeting area.

17. The electronic device of claim 16, wherein the adjustment of a user defined message receiving setting further includes only receiving messages having an urgent priority associated therewith.

18. The electronic device of claim 12, wherein said received geo-location based signal data is data indicative of the present communication service provider which determines whether roaming charges presently apply.

19. The electronic device of claim 18, wherein the adjustment of a user defined message receiving setting further includes only receiving messages having an urgent priority associated therewith.

20. The electronic device of claim 12, wherein the adjustment of a user defined message receiving setting further includes prohibiting receiving a message having an attachment.

* * * * *